United States Patent [19]

Zeitler et al.

[11] Patent Number: 5,288,549
[45] Date of Patent: Feb. 22, 1994

[54] COMPOSITE ELEMENT COMPRISING A TOP LAYER AND A BASE LAYER OF THERMOPLASTIC POLYURETHANES, ITS PREPARATION, AND ITS USE

[75] Inventors: Gerhard Zeitler, Hessheim; Thomas Friedl, Diepholz, both of Fed. Rep. of Germany

[73] Assignee: BASF Aktiengesellschaft, Ludwigshafen, Fed. Rep. of Germany

[21] Appl. No.: 848,616

[22] Filed: Mar. 9, 1992

[51] Int. Cl.$^5$ .................. B32B 3/26; B32B 27/00; B29C 67/00; B29C 65/00
[52] U.S. Cl. .................. 428/318.6; 428/318.8; 428/319.3; 428/423.3; 264/46.4; 264/46.5; 264/46.6; 264/126
[58] Field of Search .............. 428/318.6, 318.8, 319.3, 428/423.3; 264/46.4, 46.5, 46.6, 126

[56] References Cited

U.S. PATENT DOCUMENTS

| | | | |
|---|---|---|---|
| 3,649,600 | 3/1972 | Harper et al. | 260/77.5 |
| 4,061,815 | 12/1977 | Poole, Jr. | 428/215 |
| 4,211,848 | 7/1980 | Blount | 521/154 |
| 4,423,185 | 12/1983 | Matsumoto et al. | 525/66 |
| 4,515,852 | 5/1985 | Katabe et al. | 428/246 |
| 4,789,720 | 12/1988 | Teffenhart | 528/76 |
| 4,906,516 | 3/1990 | Okamura et al. | 428/215 |
| 5,128,196 | 7/1992 | Luetkans, Jr. et al. | 428/213 |

FOREIGN PATENT DOCUMENTS

| | | |
|---|---|---|
| 350219 | 5/1979 | Austria . |
| 1669550 | 5/1971 | Fed. Rep. of Germany . |
| 2917478 | 9/1980 | Fed. Rep. of Germany . |
| 1549421 | 8/1979 | United Kingdom . |
| WO8908672 | 9/1989 | World Int. Prop. O. . |

Primary Examiner—George F. Lesmes
Assistant Examiner—Kathryne E. Shelborne
Attorney, Agent, or Firm—Dennis V. Carmen

[57] ABSTRACT

A composite element which comprises an elastic, cellular top layer (A) and a rigid base layer (B) of thermoplastic polyurethanes, the polyurethane elastomer (B) of the base layer being prepared by reacting Ba) 1 mol of at least one essentially linear, relatively high-molecular-weight polyesterol or polyetherol,
Bb) from 6 to 15 mol of an organic diisocyanate, preferably 4,4'-diphenylmethane diisocyanate, and
Bc) from 5 to 14 mol of at least one alkanediol or dialkylene glycol, in the presence of Bd) from 0.05 to 0.3% by weight, based on the total weight of (Ba) to (Bc), of water, and, if desired,
Be) a catalyst, and
Bf) assistants and/or additives, is used as a cushioned fitting for vehicles.

7 Claims, No Drawings

COMPOSITE ELEMENT COMPRISING A TOP LAYER AND A BASE LAYER OF THERMOPLASTIC POLYURETHANES, ITS PREPARATION, AND ITS USE

The present invention relates to a composite element which comprises an elastic, cellular top layer (A) and a rigid base layer (B) of thermoplastic polyurethanes, the polyurethane elastomer (B) of the base layer being prepared by reacting Ba) 1 mol of at least one essentially linear, relatively high-molecular-weight polyesterol or polyetherol Bb) from 6 to 15 mol of an organic diisocyanate, and Bc) from 5 to 14 mol of at least one alkanediol or dialkylene glycol, in the presence of Bd) from 0.05 to 0.3% by weight, based on the total weight of (Ba) to (Bc), of water, and, if desired, Be) a catalyst, and Bf) assistants and/or additives, to the preparation of the composite element and to its use.

Composite elements which comprise a top layer, for example a plastic film, of polyvinyl chloride or a polyvinyl chloride containing polymer mixture, for example ABS/PVC, and are provided with a foam backing of a polyurethane foam (also abbreviated to PU foam below), for example a soft-elastic or semirigid PU foam, using a mold, have been known for some time and are described, for example, in Kunststoff-Handbuch Polyurethane, Volume 7, (1983) 2nd Edition, edited by Dr. G. Oertel (pages 235 ff. Carl Hanser Verlag, Munich, Vienna).

Composite elements of this type are of considerable industrial importance, in particular in the automotive industry, and are used, for example, as seat cushions, back, neck and armrests, sun visors, instrument panels, dashboards, door panels, inter alia.

Suitable top layers can be produced by known processes. Polyvinyl chloride (PVC) films can be obtained, for example, by the powder slush process. In this, the mold is heated in an oven to approximately 250° C., the pulverulent PVC is then distributed uniformly therein, and the PVC film is gelled by re-heating the mold in the oven. After the mold has been cooled, for example in a water bath, the film can be removed and provided with a foam backing. In another procedure, slush molding, an electroplated mold is completely filled with a PVC plastisol comprising about 55% by weight of PVC, 35% by weight of plasticizer, assistants and, if desired a pigment paste. When the mold is heated, the PVC plastisol pre-gels on the walls. The excess is removed, and the gelling is completed at from 280° to 350° C.

PVC/ABS and PVC/ABS/polyvinyl acetate polymer mixtures for the production of large-area top layers, for example for dashboards or door panels, consoles, inter alia, are processed virtually exclusively by vacuum forming. The films comprising polymer mixtures are preheated using IR lamps and vacuum formed using thermoforming molds, for example made of epoxy resins or aluminum.

The composite elements are produced using top layers, preferably films, having a thickness, which varies depending on the production process, of from approximately 0.5 to 3 mm, preferably from 0.8 to 1.5 mm.

Composite elements provided with PVC or polyvinyl chloride containing polymers as the top layer have significant disadvantages. As is known, when PVC is heated or heated and exposed to UV light, it begins to decompose significantly from as low as 100° C. with elimination of hydrogen chloride. This decomposition is accelerated autocatalytically by the PU foam which contains bonded urea and urethane groups (Vysokomol. soyed. A 30, No. 4, 1988, pages 829–833). In order to obtain void-free PU moldings, specific amine catalysts are frequently employed to balance controlled polyaddition and blowing reactions; however, these also contribute to degradation of the PVC. Thus, constituents, for example catalysts, stabilizers, inter alia, diffuse out of the PU foam into the top layer, and conversely plasticizer migrates out of the polyvinyl chloride-containing top layer into the PU foam. These migration processes mechanically damage the moldings, for example through shrinkage or embrittlement, and modify their appearance due to discoloration and spotting (Kunststofftechnik, VDI-Verlag GmbH, Dsseldorf, 1987, Kunst-stoffe als Problemlser im Automobilbau", pages 141 ff.).

Composite elements made from different types of plastic have the further disadvantage of being difficult to recycle; however, recycling is increasing in importance. Multilayer composite elements, which may comprise, for example, a compact top or decorative layer, for example of a polyvinyl chloride film, a cellular intermediate layer, for example a flexible PU foam or polypropylene foam and a rigid base layer, for example of a metal or polyamide, must be separated into the individual constituents and sorted. Since suitable separating equipment is currently not available for this purpose, this separation is labor-intensive and therefore very expensive.

The preparation of PU foams is furthermore disclosed in numerous patents and other publications, as is the preparation of prepolymers containing NCO groups.

It is an object of the present invention to develop a cushioned composite element which essentially consists of a single material and is therefore recycling-compatible. Production of the composite element should be very simple and inexpensive and possible using technically proven equipment. In addition, the shrinkage on heating and crystallization should be reduced to an acceptable level.

We have found that, surprisingly, this object is achieved by means of thermoplastic polyurethanes (also abbreviated to TPU below) which, depending on their use as the elastic top layer or the rigid base layer, have different chemical structures and different mechanical properties.

The present invention accordingly provides a composite element built up from

A) an elastic, cellular polyurethane sheet-like structure comprising a thermoplastic polyurethane as the top layer, and B) a thermoplastic polyurethane elastomer as the base layer, which is itself prepared by reacting Ba) 1 mol of at least one essentially linear polyesterol or polyetherol having a molecular weight of from 600 to 3000, Bb) from 6 to 15 mol of an organic diisocyanate, and Bc) from 5 to 14 mol of at least one alkanediol or dialkylene glycol, in the presence of Bd) from 0.05 to 0.3% by weight, based on the total weight of (Ba) to (Bc), of water.

The base layer is furthermore preferably produced in the presence of

Be) a catalyst, and, if desired,

Bf) assistants and/or additives.

The present invention furthermore provides a process as claimed in claim 9 for the production of the composite element and its preferred use, as claimed in claim 10, as a cushioned fitting for vehicles.

The composite element produced according to the invention from TPU is fully recyclable. It can be liquefied by heating and converted from a liquid state into granules. The TPU granules can be reconverted into moldings by known methods of thermoplastic processing.

By using starting components (Ba) to (Bc) to prepare the TPU elastomer (B) in the mixing ratios according to the invention, the ratio between the number of equivalents of NCO groups of the organic diisocyanate (Bb) and the total of hydroxyl groups in (Ba) and (Bc) expediently having a value in the range from 0.85:1 to 1.1:1, highly free-flowing, readily handled reaction mixtures are obtained which, after curing, give TPU elastomers having the rigidity technically required for base layers. The additional use of water increases the rigidity of the TPU base without its density being reduced excessively. The addition of water and the resultant low level of cell formation in the base layer also reduce the shrinkage of the TPU elastomer on heating and crystallization to an acceptable level. In order to keep the maximum reaction temperature due to the liberated heat of reaction as low as possible, the reaction is preferably carried out by the prepolymer method.

The following details apply to the TPUs which can be used in the production of the composite element according to the invention for the elastic, cellular PU sheet-like structure as the top layer (A) and as the base layer (B):

A) Elastic, cellular PU sheet-like structures which are suitable as the top layer (A) usually have a thickness of from 0.1 to 25 mm, preferably from 0.5 to 20 mm, in particular from 2 to 10 mm, an overall density of from 0.2 to 1.0 g/cm$^3$, preferably from 0.2 to 0.8 g/cm$^3$, in particular from 0.3 to 0.5 g/cm$^3$, and they expediently have a smooth, compact, essentially pore-free surface on one side, the visible side. The PU sheet-like structures (A) can be produced by known processes, preferably by sintering a mixture containing i) at least one pulverulent, thermoplastic polyurethane (A) and ii) at least one blowing agent which is solid at 23° C., at elevated temperature, for example at from 180° to 280° C., using a mold.

They are prepared using a TPU (A) or expediently a TPU (A) mixture of at least two TPUs (A) having different melt flow indices, an advantageous procedure comprising first sintering the TPU (A) or the TPU (A) mixture of high melt flow index to form the compact, essentially cell-free surface, and subsequently foaming and simultaneously sintering the TPU (A) or the TPU (A) mixture of low melt flow index or relatively high softening point in the presence of a solid blowing agent.

The elastic, cellular, PU sheet-like structure as the top layer (A) is advantageously produced using one or more TPUs (A) having a melt flow index (MFI) at 190° C. and a weight of 212N (21.6 kp) of preferably from 50 to 350 and in particular from 100 to 300, and a Shore A hardness of preferably from 60 to 98, in particular from 80 to 95.

TPUs (A) having such melt flow indices and hardnesses are known from the prior art and can be prepared by reacting Aa) a polyhydroxyl compound, preferably an essentially linear polyhydroxyl compound, having a molecular weight of from 500 to 8000, in particular a polyalkylene glycol polyadipate having 2 to 6 carbon atoms in the alkylene radical and having a molecular weight of from 500 to 6000 or a polyoxytetramethylene glycol having a molecular weight of from 500 to 3500, Ab) an organic and/or modified organic diisocyanate, and Ac) a diol having a molecular weight of from 60 to 400, in particular 1,4-butanediol, as chain extender, in the presence of Ae) a catalyst, and, if desired, Af) assistants and/or additives, at elevated temperature.

The following details apply to the starting components (Aa) to (Ac) and, if used, (Ae) and/or (Af):

Aa) Suitable relatively high-molecular-weight polyhydroxyl compounds (Aa) having molecular weights of from 500 to 8000 are preferably polyetherols and in particular polyesterols. However, other hydroxyl-containing polymers containing ether or ester groups as bridges, for example polyacetals, such as polyoxymethylenes and in particular water-insoluble formals, for example polybutanediol formal and polyhexanediol formal, and polycarbonates, in particular those prepared from diphenyl carbonate and 1,6-hexanediol, for example by transesterification, are also suitable. The polyhydroxyl compound must be at least substantially linear, ie. have a difunctional structure in the context of the isocyanate reaction. Said polyhydroxyl compound may be used as an individual component or in the form of a mixture.

Suitable polyetherols can be prepared by known processes, for example by anionic polymerization using alkali metal hydroxides, such as sodium hydroxide or potassium hydroxide, or alkali metal alkoxides, such as sodium methoxide, sodium ethoxide, potassium ethoxide or potassium isopropoxide, as catalyst and with addition of at least one initiator molecule containing 2 to 3, preferably 2 bonded reactive hydrogen atoms, or by cationic polymerization using Lewis acids, such as antimony pentachloride, boron fluoride etherate, inter alia, or bleaching earth as catalyst, from one or more alkylene oxides having 2 to 4 carbon atoms in the alkylene radical.

Examples of suitable alkylene oxides are preferably tetrahydrofuran, 1,3-propylene oxide, 1,2- and 2,3-butylene oxide and particularly preferably ethylene oxide and 1,2-propylene oxide. The alkylene oxides may be used individually, alternately one after the other or as a mixture. Examples of suitable initiator molecules are water, organic dicarboxylic acids, such as succinic acid, adipic acid and/or glutaric acid, alkanolamines, for example ethanolamine, N-alkylalkanolamines, N-alkyldialkanolamines, for example N-methyland N-ethyldiethanolamine, and preferably dihydric alcohols, possibly containing bonded ether bridges, for example ethanediol, 1,2-propanediol, 1,3-propanediol, 1,4-butanediol, diethylene glycol, 1,5-pentanediol, 1,6-hexanediol, dipropylene glycol, 2-methyl-1,5-pentanediol and 2-ethyl-1,4-butanediol. The initiator molecules may be employed individually or as a mixture.

Preference is given to polyetherols made from 1,2-propylene oxide and ethylene oxide in which more than 50%, preferably from 60 to 80%, of the OH groups are primary hydroxyl groups and in which at least some of the ethylene oxide is arranged as a terminal block. Polyetherols of this type can be obtained by, for example, polymerizing first the 1,2-propylene oxide and then the ethylene oxide onto the initiator molecule or by first copolymerizing all the 1,2-propylene oxide mixed with some of the ethylene oxide and then polymerizing on the remainder of the ethylene oxide or stepwise by first polymerizing some of the ethylene oxide, then all the 1,2-propylene oxide and then the remainder of the ethylene oxide onto the initiator molecule.

The hydroxyl-containing products of the polymerization of tetrahydrofuran, polyoxytetramethylene glycols, are also very highly suitable, those having molecular weights of from 500 to 3500 being particularly preferred.

The essentially linear polyetherols have molecular weights of from 500 to 8000, preferably from 600 to 6000, in particular from 800 to 3500. They can be used individually or in the form of mixtures with one another.

Suitable polyesterols can be prepared, for example, from dicarboxylic acids having 2 to 12, preferably 4 to 6, carbon atoms and polyhydric alcohols. Examples of dicarboxylic acids are aliphatic dicarboxylic acids, such as succinic acid, glutaric acid, adipic acid, subaric acid, azelaic acid and sebacic acid, and aromatic dicarboxylic acids, such as phthalic acid, isophthalic acid and terephthalic acid. The dicarboxylic acids may be used individually or as mixtures, for example in the form of a mixture of succinic, glutaric and adipic acids. To prepare the polyesterols, it may be advantageous to replace the dicarboxylic acids by corresponding dicarboxylic acid derivatives, such as dicarboxylic acid monoesters and/or diesters having 1 to 4 carbon atoms in the alcohol radical, dicarboxylic anhydrides or dicarboxylic acid dichlorides. Examples of polyhydric alcohols are alkanediols having 2 to 10, preferably 2 to 6 carbon atoms and/or dialkylene ether glycols having 4 to 12, preferably 4 to 6, carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending on the desired properties, the polyhydric alcohols can be used individually or, if desired, in mixtures with one another.

Also suitable are esters of carbonic acid with said alkanediols or dialkylene glycols, in particular those having 4 to 6 carbon atoms, such as 1,4-butanediol and/or 1,6-hexanediol, products of the condensation of ω-hydroxycarboxylic acids, for example ω-hydroxycaproic acid, and preferably products of the polymerization of lactones, for example substituted or unsubstituted ω-caprolactones.

Preferred polyesterols are ethanediol polyadipates, 1,4-butanediol polyadipates, ethanediol 1,4-butanediol polyadipates, 1,6-hexanediol neopentyl glycol polyadipates, 1,6-hexanediol 1,4-butanediol polyadipates and polycaprolactones.

The polyesterols have molecular weights of from 500 to 6000, preferably from 800 to 3500.

Ab) Suitable organic diisocyanates (Ab) are preferably aliphatic, cycloaliphatic and aromatic diisocyanates. Specific examples are aliphatic diisocyanates, such as hexamethylene 1,6-diisocyanate, 2-methylpentamethylene 1,5-diisocyanate, 2-ethylbutylene 1,4-diisocyanate or mixtures of at least two of the said aliphatic diisocyanates, cycloaliphatic diisocyanates, such as isophorone diisocyanate, 1,4-cyclohexane diisocyanate, 1-methyl-2,4- and 2,6-cyclohexane diisocyanates and the corresponding isomer mixtures, 4,4'-, 2,4'- and 2,2'-dicyclohexylmethane diisocyanates and the corresponding isomer mixtures, and aromatic diisocyanates, such 2,4-tolylene diisocyanate, mixtures of 2,4- and 2,6-tolylene diisocyanates, 4,4'-, 2,4'- and 2,2'-diphenylmethane diisocyanates, mixtures of 2,4'- and 4,4'-diphenylmethane diisocyanates, urethane-modified liquid 4,4'- and/or 2,4'-diphenylmethane diisocyanates, 4,4'-diisocyanato-1,2-diphenylethane, mixtures of 4,4'-, 2,4'- and 2,2'-diisocyanato-1,2-diphenylethane, advantageously those having a 4,4'-diisocyanato-1,2-diphenylethane content of at least 95% by weight, and 1,5-naphthylene diisocyanate. Preference is given to diphenylmethane diisocyanate isomer mixtures having a 4,4'-diphenylmethane diisocyanate content of greater than 96% by weight, and in particular essentially pure 4,4'-diphenylmethane diisocyanate, hexamethylene 1,6-diisocyanate, isophorone diisocyanate and 4,4'- and/or 2,4'-dicyclohexylmethane diisocyanates.

The organic diisocyanate may, if desired, be replaced in minor amounts, for example in amounts of up to 3 mol %, preferably up to 1 mol %, based on the organic diisocyanate, by a polyisocyanate with a functionality of three or more; however, these amounts must be limited so that thermoplastic polyurethanes are still obtained. A larger amount of such isocyanates with a functionality of more than two is expediently compensated by simultaneously using compounds containing reactive hydrogen atoms with a functionality of less than two, so that excessive chemical crosslinking of the polyurethane is avoided. Examples of isocyanates with a functionality of more than two are mixtures of diphenylmethane diisocyanates and polyphenyl-polymethylene polyisocyanates, so-called crude MDI, and liquid 4,4'- and/or 2,4'-diphenylmethane diisocyanates which have been modified by isocyanurate, urea, biuret, allophanate, urethane and/or carbodiimide groups.

Examples of suitable monofunctional compounds containing reactive hydrogen atoms, which can also be used as molecular weight regulators, are monoamines, for example butylamine, dibutylamine, octylamine, stearylamine, N-methylstearylamine, pyrrolidone, piperidine and cyclohexylamine, and monoalcohols, for example butanol, amyl alcohol, 1-ethylhexanol, octanol, dodecanol, cyclohexanol and ethylene glycol monoethyl ether.

Ac) Suitable chain extenders (Ac) having molecular weights of from 60 to 400, preferably from 60 to 300, are preferably aliphatic diols or dialkylene glycols having 2 to 12 carbon atoms, preferably having 2, 4 or 6 carbon atoms, for example ethtnediol, 1,6-hexanediol, diethylene glycol, dipropylene glycol and in particular 1,4-butanediol. However, diesters of terephthalic acid with glycols having 2 to 4 carbon atoms, for example terephthalic acid bis(ethylene glycol) or bis-1, 4-butanediol, and hydroxyalkylene ethers of hydroquinone, for example, 1,4-di(β-hydroxyethyl)hydroquinone, and polyoxytetramethylene glycols having molecular weights of from 162 to 378, are also suitable. In order to adjust the hardness and melt flow index, the starting components can be varied within relatively broad molar ratios, the hardness and melt viscosity increasing with increasing content of chain extender (Ac), while the melt flow index decreases.

To prepare the TPU (A), the essentially difunctional polyhydroxyl compound (Aa) and the diol (Ac) are advantageously used in a molar ratio of from 1:2 to 1:6, preferably from 1:2.5 to 1:4.5, so that the resultant TPU has a Shore A hardness of from 60 to 98, preferably from 80 to 95.

Ae) Suitable catalysts which accelerate, in particular, the reaction between the NCO groups of the diisocyanate (Ab) and the hydroxyl group of starting components (Aa) and (AC) are the conventional tertiary amines known from the prior art, for example triethylamine, dimethylcyclohexylamine, N-methylmorpholine, N,NI'-dimethyl-piperazine, diazabicyclo[2.2.2]octane and the like, and, in particular, organometallic compounds, such as esters of titanic acid, iron compounds, tin compounds, for example tin diacetate, tin dioctanoate, tin dilaurate and the dialkyltin salts of aliphatic carboxylic acids, such as dibutyltin diacetate, dibutyltin dilaurate and the like. The catalyst is usually employed in an amount of from 0.001 to 0.1 part by weight per 100 parts by weight of the mixture of the polyhydroxyl compound (Aa) and the diol (AC).

Af) In addition to a catalyst, assistants and/or additives, (Af) may be mixed with the starting components. Specific examples are lubricants, inhibitors, stabilizers against hydrolysis, light, heat or discoloration, flameproofing agents, dyes, pigments and inorganic and/or organic fillers.

To this end, the assistants and/or additives (Af) can be introduced into the starting components or into the reaction mixture for the preparation of the TPU (A). In another process variant, however, the assistants and/or additives (Af) are mixed with the TPU (A) and subsequently melted. The latter method is used, in particular, for introducing aluminum oxide and/or silica gel and fillers, including reinforcing fillers.

If further details are not given below on the assistants and additives which can be used, they can be obtained from the specialist literature, for example from the monograph by J.H. Saunders and K.C. Frisch, High Polymers, Volume XVI, Polyurethane, Parts 1 and 2 (Interscience Publishers, 1962 and 1964 respectively), Kunststoff-Handbuch, Volume 7, Polyurethane, 1st and 2nd Edition (Carl Hanser Verlag, 1966 and 1983 respectively) and DE-A2 9 01 774.

To prepare the TPU (A), the starting components (Aa), (Ab) and (Ac) are reacted, in the presence of a catalyst (Ae) and, if desired, assistants and/or additives (Af), in such amounts that the ratio between the number of equivalents of NCO groups of the diisocyanate and the total number of hydroxyl groups in components (Aa) and (Ac) is from 0.80 to 1.20:1, preferably from 0.95 to 1.05:1, in particular approximately 1:1.

The TPU (A) which can be used according to the invention can be prepared by the extruder process or preferably by the belt process by batchwise or continuous mixing of the starting components (Aa) to (Ac) and, if used, (Ae) and/or (Af), allowing the reaction mixture to react in the extruder or on a carrier belt at from 60° to 250° C., preferably at from 70 to 150° C., and subsequently granulating the resultant TPU (A). It may be expedient to condition the resultant TPU (A) at from 80° to 120° C., preferably from 100° to 110° C., for from 1 to 24 hours before further processing.

As stated above, the TPU (A) is preferably prepared by the belt process. To this end, the starting components (Aa) to (Ac) and, if used, (Ae) and/or (Af), are mixed continuously using a mixer head at above the melting point of the starting components (Aa) to (Ac). The reaction mixture is fed onto a carrier, preferably a conveyor belt, for example made of metal, and passed through a 1 to 20 meter, preferably 3 to 10 meter, conditioned zone at a speed of from 1 to 20 m/minutes, preferably from 4 to 10 m/minutes. The reaction temperature in the conditioned zone is from 60° to 200° C., preferably from 80° to 180° C. Depending on the diisocyanate content in the reaction mixture, the reaction is controlled by cooling or heating in such a manner that at least 90%, preferably at least 98%, of the isocyanate groups of the diisocyanate are reacted and the reaction mixture solidifies at the chosen reaction temperature. As a consequence of the free isocyanate groups in the solidified reaction product, which make up, based on the total weight, from 0.05 to 1% by weight, preferably from 0.1 to 0.5% by weight, a TPU (A) having a relatively low melt viscosity and a high melt flow index is obtained.

It has proven advantageous, for example, in order to modify the mechanical properties or photostability of the elastic, cellular PU sheet-like structure (A), and depending on its use, to use mixtures of two or more TPUs (A) in certain, experimentally determined amounts by weight instead of one TPU (A).

Thus, for example, black, cellular PU sheet-like structures made from TPUs (A) based on aromatic diisocyanates, preferably 4,4'-diphenylmethane diisocyanate, and virtually any polyhydroxyl compounds (Aa) and diols (Ac) can be prepared. Although TPUs (A) based on aliphatic diisocyanates are photostable, they are, however, relatively difficult to crystallize and can only be handled with difficulty after thermoplastic processing. By blending TPUs (A) based on aromatic diisocyanates with those based on aliphatic and/or cycloaliphatic diisocyanates, it is possible, for example, to substantially improve the photostability of the elastic, cellular sheet-like structures without the TPU mixture having any significant tendency to adhere to the mold during processing. This method also allows cellular moldings which have a photostability which is adequate for other color modifications and which, surprisingly, are essentially tack-free to be prepared from TPUs (A) based on aromatic and aliphatic and/or cycloaliphatic diisocyanates.

In a similar manner, the mechanical properties of the elastic, cellular PU sheet-like structure, its oxidation and hydrolysis stability and, depending on the choice of diisocyanate, as stated above, the photostability, for example, can be modified as desired through a suitable choice of TPU (A) made from different polyhydroxyl compounds, in particular those made from polyetherols or polyesterols.

For the preparation of soft, elastic, cellular PU sheet-like structures, use is preferably made, for example, of TPU mixtures which comprise, based on 100 parts by weight, A1) from 40 to 99.5 parts by weight, preferably from 60 to 85 parts by weight, of a TPU (A1) prepared using an aromatic diisocyanate, preferably 4,4'-diphenylmethane diisocyanate, and A2) from 0.5 to 60 parts by weight, preferably from 15 to 40 parts by weight, of a TPU (A2) prepared using an aliphatic diisocyanate, preferably selected from the group comprising hexamethylene 1,6-diisocyanate, isophorone diisocyanate and 4,4'-dicyclohexylmethane diisocyanate or mixtures of at least two of said diisocyanates, or TPU mixtures which comprise, based on 100 parts by weight, AI) from 60 to 99.5 parts by weight, preferably from 70 to 90 parts by weight, of a TPU (AI) prepared using at least one polyoxyalkylene glycol, for example a polyoxypropylene glycol, polyoxypropylene-polyoxyethylene glycol or polyoxytetramethylene glycol, and AII) from 0.5 to 40 parts by weight, preferably from 10 to 30 parts by weight, of a TPU (AII) prepared using a polyesterdiol, preferably a polyalkanediol polyadipate having from 2 to 6 carbon atoms in the alkanediol radical, and, in particular, TPU mixtures comprising, based on 100 parts by weight, AII) from 60 to 95 parts by weight, preferably from 70 to 90 parts by weight, of a TPU (AII) prepared using 4,4'-diphenylmethane diisocyanate and a polyoxytetramethylene glycol having a molecular weight in the range from 500 to 3500, A2II) from 5 to 40 parts by weight, preferably from 10 to 30 parts by weight, of a TPU (A2II) prepared using isophorone diisocyanate and a polyester-diol, preferably a polyalkanediol polyadipate having a molecular weight in the range from 800 to 3500.

The TPU (A) which is suitable, after sintering, for the production of elastic, cellular PU sheet-like structures is expediently comminuted by means of suitable known equipment, for example a grinder, and sintered with a mean particle size distribution of from 1 to 1000 µm, preferably from 50 to 800 µm, in particular from 100 to 500 µm.

In order to improve the flow properties of this TPU (A) powder and in particular to reduce the flow of the TPU (A) melt past vertical or superheated points of the mold, pulverulent aluminum oxide or in particular pulverulent silica gel or, if desired, a mixture of aluminum oxide and silica gel is expediently incorporated into the pulverulent TPU (A). Addition of only from 0.05 to 1 parts by weight, preferably from 0.1 to 0.3 parts by weight of aluminum oxide and/or silica gel, based on 100 parts by weight of TPU (A) powder, prevents the TPU (A) melt flowing off vertical mold surfaces or superheated points of the mold during sintering and prevents the formation of thin areas or holes, in particular in cellular sheet-like structures of low thickness. This process variant allows, for example, cellular sheet-like structures having a very uniform thickness distribution to be produced.

As described above, assistants and/or additives can additionally be introduced into the TPU (A) or the TPU (A) powder.

Mention may be made of fillers, for example organic fillers, eg. carbon black and melamine, and inorganic fillers, for example quartz sand, talc, amorphous silica or mixtures thereof.

Examples of proven flameproofing agents are melamin, expandable graphite, ammonium polyphosphates, polyhalodiphenyl ethers, polyhalophthalic acid and derivatives thereof, polyhalooligo- and -polycarbonates, the corresponding bromine compounds being particularly effective. Other suitable flameproofing agents are phosphorus compounds, such as elemental phosphorus or organophosphorus compounds. In addition, the flameproofing agents generally additionally contain a synergist, for example antimony trioxide.

Examples of suitable antioxidants and heat stabilizers are halides of metals of group I of the Periodic Table, for example halides of sodium, potassium and lithium, alone or in combination with copper (I) halides, for example chlorides, bromides or iodides, stearically hindered phenols, hydroquinones, and substituted compounds of these groups and mixtures thereof, which are preferably used in concentrations of up to 1% by weight, based on the weight of the TPU (A).

Examples of UV stabilizers are various substituted resorcinols, salicylates, benzotriazoles and benzophenones as well as stearically hindered amines, which are generally employed in amounts of up to 2.0% by weight, based on the weight of the TPU (A).

Mold-release agents, which are generally likewise added in amounts of up to 1% by weight, based on the weight of the TPU (A), are stearic acids, stearyl alcohol, stearic acid esters and amides and the fatty acid esters of pentaerythritol.

It is also possible to add organic dyes, such as nigrosin, pigments, for example titanium dioxide, cadmium sulfide, cadmium sulfide selenide, phthalocyanines, ultramarine blue or carbon black.

Elastic, cellular PU sheet-like structures (A) are advantageously produced using blowing agents (ii) which are solid at 23° C., expediently in the form of a fine powder, for example having a mean particle size of from 1 to 300 µm, preferably from 5 to 100 µm, in particular from 10 to 80 µm, the particle size affecting the decomposition temperature and rate. The solid blowing agent is expediently a chemical compound which decomposes within a certain temperature range, which is not too large, and has a high gas yield. The decomposition temperature must be matched here to the processing temperature and the ability of the TPU (A) to be foamed to withstand heating. These conditions can easily be determined experimentally. Decomposition of the blowing agent must not be spontaneous, and heat accumulation and combustion of TPU (A) must thus be avoided. The solid blowing agent should preferably be homogeneously miscible with the TPU (A) and should give decomposition products which cause no health problems, do not, as far as possible, adversely affect the thermal stability and mechanical properties of the cellular PU sheet-like structure (A), do not exhibit bloom and do not cause any discoloration.

Examples of solid blowing agents which satisfy these requirements, at least partly or essentially fully, are azo compounds, for example azoisobutyronitrile, azodicarbonamide, frequently also known as azobisformamide and barium azodicarboxylate, hydrazines, for example diphenylsulfone 3,3'-disulfohydrazide, 4,4'-oxybis(benzenesulfohydrazide), trihydrazinotriazine and arylbis(sulfohydrazide), semicarbazides, for example p-tolylenesulfonyl semicarbazide and 4,4'-oxybis(benzenesulfonyl semicarbazide), triazoles, for example 5-morpholyl-1,2,3,4-thiatriazole, and N-nitroso compounds, for example N,N'-dinitrosopentamethylenetetramine and N,N-dimethyl-N,N'-dinitrosoterephthalamide. Of said compounds, the azo compounds and hydrazines have proven particularly suitable, and preference is thus given to azoisobutyronitrile, diphenyl sulfone 3,3'-disulfohydrazide, 4,4'-oxybis(benzenesulfohydrazide) and in particular azodicarbonamide. The solid blowing agent may be employed as an individual compound or as a mixture.

The amount of blowing agent necessary for the production of the elastic, cellular PU sheet-like structure (A) depends, inter alia, on the desired density and thickness of the sheet-like structure and on the gas yield of the blowing agent. It is usual to employ from 0.05 to 18 parts by weight, preferably from 0.1 to 10 parts by weight, in particular from 0.5 to 4 parts by weight, of one or more pulverulent blowing agents (ii), which are preferably solid at 23° C., per 100 parts by weight of at least one pulverulent TPU (A).

In order to produce the elastic, cellular PU sheet-like structure, at least one pulverulent TPU (A) and at least one pulverulent blowing agent (ii) are mixed homogeneously usually at below 80° C., preferably at from 0° to 65° C., using conventional mixing equipment, for example mixers produced by Draiswerke GmbH or Henschel. The TPU/blowing agent mixture is subsequently introduced in an amount which is sufficient with respect to the desired thickness of the sheet-like structure, onto the surface of a mold which has been heated to from 180° to 280° C., preferably from 190° to 250° C., in particular from 190° to 240° C., and the excess TPU/blowing agent mixture is removed after a brief contact time, for example after from 10 to 30 seconds, preferably from 16 to 25 seconds. The TPU/blowing agent powder layer adhering to the mold surface can be sintered and foamed by means of the thermal capacity of the mold or by reheating, for example by heating in an oven or by irradiation, a relatively narrow temperature range within the abovementioned range usually being observed. In order to achieve specific properties, for example an elastic, cellular PU sheet-like structure having an essentially pore-free, smooth surface, it may be expedient to increase the surface temperature of the mold continuously or in steps. This process variant is preferred when mixes of TPUs (A) having different melt flow indices are used; for example, a TPU (A) having a low softening point is first sintered to give a compact surface, and the TPU (A) having a relatively high softening range is then sintered and foamed while the temperature is increased into the decomposition range of the blowing agent.

When the foaming and sintering process is complete, usually after from 0.25 to 5 minutes, preferably from 0.5 to 3 minutes, the mold is allowed to cool, for example in air, in a stream of inert gas or air, possibly cooled, or in a water bath, and the cellular molding formed is demolded within from 30 to 60 seconds.

The elastic, cellular PU sheet-like structure (A) for the top layer produced by sintering have good mechanical properties, in particular high tear strength, a dry, pleasant hand and virtually no odor.

B) The base layer used according to the invention is a TPU elastomer prepared by reacting Ba) 1 mol of at least one essentially linear polyetherol or preferably polyesterol having a molecular weight of from 600 to 3000, preferably from 1000 to 2300, Bb) from 6 to 15 mol, preferably from 9 to 12 mol, of an organic, preferably aromatic diisocyanate, and Bc) from 5 to 14 mol, preferably from 8 to 11 mol, of at least one alkylene glycol or preferably an alkanediol, in the presence of Bd) from 0.05 to 0.3% by weight, preferably from 0.08 to 0.15% by weight, based on the total weight of (Ba) to (Bc), of water and, if desired, Be) a catalyst, and, if desired, Bf) assistants and/or additives.

Ba) Starting component (Ba) may be a polyetherol or preferably a polyesterol as described under (Aa), with the proviso that it has a molecular weight in the range from 600 to 3000. Compounds which have proven highly successful and are therefore preferred are polyoxytetramethylene glycols and essentially linear polyalkanediol polyadipates having 2 to 6 carbon atoms in the alkanediol radical, in particular 1,4-butanediol polyadipates.

Bb) Suitable organic diisocyanates are aliphatic, cycloaliphatic and preferably aromatic diisocyanates. Specific examples are 1,6-hexamethylene diisocyanate, isophorone diisocyanate, 2,4'-diphenylmethane diisocyanate, 1,5-naphthylene diisocyanate and preferably 4,4'-diphenylmethane diisocyanate.

Bc) Examples of suitable dialkylene glycols are diethylene glycol, dipropylene glycol and dibutylene glycol. However, preference is given to alkanediols, expediently those having 2 to 6 carbon atoms, preferably 2, 4 or 6 carbon atoms, forexampleethanediol, 1,3-propanediol, 1,5-pentanediol, 1,6-hexanediol and preferably 1,4-butanediol.

Bd) As stated above, the preparation of the TPU elastomer (B) is carried out in the presence of from 0.05 to 0.3% by weight of water, based on the total weight of (Aa) to (Ac), in order to increase the rigidity of the base material (B) and to reduce its shrinkage behavior. If larger amounts of water are used, the density, and thus also the rigidity, of the TPU elastomer (B) are reduced excessively.

Be) In a similar manner to the preparation of TPU (A) for the top layer, a catalyst, for example those mentioned under (Ae) can also be employed for the preparation of the TPU (B) for the base - layer. Preferred catalysts are diazobicyclo[2.2.2]octane and dibutyltin dilaurate, which are usually employed in an amount of from 0.0002 to 0.04% by weight, preferably from 0.001 to 0.25% by weight, based on the weight of starting components (Ba) to (Bc).

Bf) Examples of suitable assistants and/or additives (Bf) for the preparation of the TPU (B) are the compounds mentioned under (Af). Preference is given to fillers for increasing the rigidity of the base material. Particularly proven fillers are talc, kieselguhr, carbon fibers and glass fibers, which are usually employed in amounts of up to 30% by weight, preferably from 15 to 25% by weight, based on the weight of starting components (Ba) to (Bc).

To prepare the TPU elastomer (B) for the base layer, starting components (Ba) to (Bd) are reacted, preferably in the presence of a catalyst (Be) and, if desired, assistants and/or additives (Bf), by the one-shot process or preferably by the prepolymer process in such amounts that the ratio between the number of equivalents of NCO groups of the diisocyanate (Bb) and the total number of hydroxyl groups in the starting components (Ba) and (Bc) is from 0.85:1 to 1.1:1, preferably from 0.95:1 to 1.05:1.

The base layer comprising the TPU elastomer (B) generally has a thickness of from 2 to 8 mm, preferably from 3 to 6 mm, a density of from 0.9 to 1.3 g/cm$^3$, preferably from 0.95 to 1.1 g/cm$^3$, the density usually being greater than 1.0 g/cm$^3$ if fillers are also used and a rigidity of from 400 to 600 N/mm$^2$, preferably from 450 to 550 N/mm$^2$ in the absence of fillers and of from 600 to 2000 N/mm$^2$, preferably from 700 to 1000 N/mm$^2$ in the presence of fillers.

To prepare the composite element according to the invention, the elastic, cellular polyurethane sheet-like structure (A) as a top layer is produced directly in the mold by the above-described method or is preferably produced in a prior process step, stored, if necessary, in the interim and laid into the mold. If the top layer (A) has a smooth, essentially pore-free surface as a visible surface, this surface is laid facing the inside of the mold. In a preferred process, the mold is at from 50° to 100° C., preferably from 60° to 80° C.

The liquid reaction mixture, obtained in the one-shot process by mixing the starting materials (Ba) to (Bd) and, if used, (Be) and (Bf), or preferably, in order to reduce the maximum reaction temperature, prepared by the prepolymer process by mixing a prepolymer which contains NCO groups and is itself obtained by reacting 1 mol of at least one essentially linear polyesterol or polyetherol having a molecular weight of from 600 to 3000 (Ba) with from 6 to 15 mol of an organic diisocyanate (Bb), with a mixture containing from 5 to 14 mol of at least one alkanediol or dialkylene glycol (Bc), from 0.05 to 0.3% by weight, based on the total weight of (Ba) to (Bc), of water and, if desired, a catalyst (Be), assistants and/or additives (Bf), usually at from 15° to 50° C., preferably at from 20° to 35° C., is introduced into the mold in such a manner that the top layer (A) comes into contact, on the side facing the mold cavity, with the reaction mixture. The mold is then closed. If the mold comprises upper and lower halves, the reaction mixture is additionally distributed over the top layer (A) when the upper half is closed. When the reaction mixture has cured, the composite element formed is demolded. The demolding time is usually from 2 to 6 minutes.

The composite elements according to the invention are preferably used in the interior of vehicles, preferably motor vehicles, as cushioned fittings, for example as safety covers, glove compartments or oddment trays, sun visors and in particular dashboards.

EXAMPLES

Production of an elastic, cellular PU sheet-like structure from TPU as the top layer (A).

EXAMPLE 1

A mixture prepared at room temperature, comprising
72 parts by weight of a TPU having a Shore A hardness of 85 and a melt flow index of 230 at 190° C. and a weight of 212N, prepared by reacting 1 mol of polyoxytetramethylene glycol having a molecular weight of 1000, 3.5 mol of 4,4'-diphenylmethane diisocyanate and 2.5 mol of 1,4-butanediol by the belt process,
parts by weight of a TPU having a Shore A hardness of 85 and a melt flow index of 180 at 190° C. and a weight of 212N, prepared by reacting 1 mol of 1,4-butanediol polyadipate having a molecular weight of 2000, 3 mol of isophorone diisocyanate and 2 mol of 1,4-butanediol by the belt process,
0.65 part by weight of ultramarine blue,
0.24 part by weight of light yellow,
0.12 part by weight of Heliogengrn ®,
0.20 part by weight of carbon black,
0.40 part by weight of titanium dioxide,
0.79 part by weight of chalk (Microcalcilin ®,)
0.8 part by weight of Irganox ® 1010 as oxidation stabilizer and
0.8 part by weight of Tinuvin ®328 as UV stabilizer, was melted at 212° C. in a ZSK twin-screw extruder. The granules obtained had a Shore A hardness of 85 and a melt flow index of 220 at 190° C. and a weight of 212N.

A powder was produced therefrom in a pin mill with addition of liquid nitrogen and had a mean particle size of from 100 to 500 μm.

In order to produce the cellular sheet-like structure (A), 100 parts by weight of the resultant TPU powder were mixed homogeneously at 23° C. with 0.1 part by weight of a finely divided silica gel and 2.5 parts by weight of azodicarbonamide having a mean particle size of 50 μm.

The TPU/blowing agent/silica gel mixture was transferred onto a steel plate at 200° C., the excess powder mixture was shaken off after a contact time of 30 seconds, the TPU/blowing agent/silica gel mixture remaining on the steel plate was then sintered, first at 210° C. for one minute and subsequently at 230° C. for 2 minutes. After the mold had been cooled to approximately 50° C. in a stream of air, the PU sheet-like structure was demolded.

A soft, elastic, cellular PU sheet-like structure (A) having a thickness of 3 mm and an overall density of 0.4 g/cm$^3$, with a smooth, compact surface on the side facing the mold, was obtained.

Production of the composite element

EXAMPLE 2 a) Preparation of a prepolymer containing NCO groups

A mixture of
140 parts by weight of 4,4'-diphenylmethane diisocyanate and
100 parts by weight of a 1,4-butanediol polyadipate having a molecular weight of 2000
was warmed to 100° C. with stirring and reacted at this temperature for 3 hours.

An NCO-containing prepolymer having an NCO content of 1.7% by weight was obtained.

b) Production of the composite element

The PU sheet-like structure (A) produced as in Example 1 was laid into a mold at 75° C. in such a manner that the smooth, compact surface faced the inside of the mold.

1000 parts by weight of the prepolymer prepared as in 2a) were mixed at 23° C., with vigorous stirring, with
a mixture comprising
190.2 parts by weight of 1,4-butanediol
1.2 parts by weight of water and
8 parts by weight of a 25% strength by weight solution of diazabicyclooctane in 1,4-butanediol.

The reaction mixture was poured onto the PU sheet-like structure (A) in the mold, and the mold was closed. After a curing time of 4 minutes, the composite element was demolded.

After cooling to room temperature and storage for 24 hours, the composite element showed no visible changes.

The TPU elastomer of the base layer (B) had a rigidity of 5.20 N/mm$^2$. The shrinkage at a density of 0.98 g/cm$^3$ was 0.9%.

EXAMPLE 3

The procedure was similar to that of Example 2, but 120 parts by weight of ground glass fibers were additionally added to 1000 parts by weight of the prepolymer containing NCO groups.

A composite element whose base layer (B) had a rigidity of 715 N/mm$^2$ was obtained.

We claim:

1. A composite element built up from
   A) an elastic, cellular polyurethane sheet-like structure comprising a thermoplastic polyurethane as the top layer, having an essentially pore-free surface, said top layer having been prepared by sintering a thermoplastic polyurethane in the presence of a solid blowing agent which is solid at 23° C., and
   B) a thermoplastic polyurethane elastomer (B) as the base layer, which is itself prepared by reacting
      (Ba) 1 mol of at least one essentially linear polyesterol or polyetherol having a molecular weight of from 600 to 3000,
      Bb) from 6 to 15 mol of an organic diisocyanate, and
      Bc) from 5 to 14 mol of at least one alkanediol or dialkylene glycol,
   in the presence of
      Bd) from 0.05 to 0.3% by weight, based on the total weight of (Ba) to (Bc), of water.

2. A composite element as claimed in claim 1, wherein the thermoplastic polyurethane elastomer (B) is prepared in the presence of
   Be) a catalyst, and, optionally,
   Bf) assistants and/or additives selected from the group consisting of lubricants, inhibitors, stabilizers, flameproof agents, dyes, pigments and fillers.

3. A composite element as claimed in claim 1, wherein the thermoplastic polyurethane elastomer (B) is prepared by reacting
   Ba) 1 mol of at least one essentially linear polyalkylene glycol polyadipate or polyoxytetramethylene glycol having a molecular weight of from 600 to 3000,
   Bb) from 6 to 15 mol of 4,4'-diphenylmethane diisocyanate, and
   Bc) from 5 to 14 mol of butanediol,
   in the presence of
   Bd) from 0.05 to 0.3% by weight, based on the total weight of (Ba) to (Bc), of water.

4. A composite element as claimed in claim 1, wherein, in the preparation of the thermoplastic polyurethane elastomer (B), the ratio between the number of equivalents of NCO groups of the organic diisocyanate (Bb) and the total number of hydroxyl groups in the polyesterol or polyetherol (Ba) and the alkanediol or dialkylene glycol (Bc) is from 0.85 to 1.1:1.

5. A composite element as claimed in claim 1, wherein the thermoplastic polyurethane elastomer (B) has a density of from 0.95 to 1.1 g/cm$^3$ and a rigidity of from 400 to 2000 N/mm$^2$.

6. A composite element as claimed in claim 1, wherein the elastic, cellular polyurethane sheet-like structure comprising thermoplastic polyurethane (A) has a smooth, essentially pore-free surface on one side.

7. A composite element as claimed in claim 1, wherein the elastic, cellular polyurethane sheet-like structure comprising thermoplastic polyurethane (A) has a thickness of from 0.1 to 25 mm and is prepared by sintering a mixture containing
   i) at least one pulverulent, thermoplastic polyurethane (A) having a melt flow index (MFI) at 190° C. and a weight of 212N (21.6 kp) of from 50 to 350 and a Shore A hardness from 60 to 98, and
   ii) at least one blowing agent which is pulverulent at 23° C. from the group comprising azoisobutyronitrile, azodicarbonamide, diphenyl sulfone 3,3'-disulfohydrazide or 4,4'-oxybis(benzenesulfohydrazide),
at from 180° to 280° C. using a mold.

* * * * *